United States Patent [19]

Madera

[11] Patent Number: 5,618,106
[45] Date of Patent: Apr. 8, 1997

[54] BEVERAGE MIXING AND DISPENSING CONTAINER

[76] Inventor: John T. Madera, 278 Helmsdale Dr., Henderson, Nev. 89014

[21] Appl. No.: 599,452

[22] Filed: Jan. 22, 1996

[51] Int. Cl.⁶ .................................................. B01F 15/02
[52] U.S. Cl. ...................... 366/130; 366/192; 220/264; 220/704; 220/716; 222/515; 222/517
[58] Field of Search ...................................... 366/129, 130, 366/192; 220/704, 711, 713, 716, 718, 719, 263, 264, 334; 222/515, 517, 555

[56] References Cited

U.S. PATENT DOCUMENTS

| | | |
|---|---|---|
| 272,506 | 2/1883 | Wright . |
| D. 318,394 | 7/1991 | Larimer ........................ D7/300.1 |
| 590,336 | 9/1897 | Rossi . |
| 737,014 | 8/1903 | O'Neill . |
| 1,042,751 | 10/1912 | Barker . |
| 1,054,833 | 3/1913 | Dutton . |
| 1,098,727 | 6/1914 | Hirsohn ........................ 220/264 |
| 1,141,207 | 6/1915 | Parent . |
| 1,254,251 | 1/1918 | Magnus . |
| 1,835,375 | 12/1931 | Carson ........................ 222/517 |
| 2,136,123 | 11/1938 | Baron ........................ 222/517 |
| 2,861,716 | 11/1958 | Kramer . |
| 4,322,954 | 4/1982 | Sheehan et al. ........................ 62/371 |
| 4,479,719 | 10/1984 | McCartney ........................ 366/130 |
| 4,818,114 | 4/1989 | Ghavi ........................ 366/130 |
| 4,872,764 | 10/1989 | McClean ........................ 366/251 |
| 4,935,129 | 6/1990 | Wang et al. ........................ 220/334 |
| 4,938,375 | 7/1990 | Fantacone ........................ 220/90.4 |
| 5,150,816 | 9/1992 | DeCastro ........................ 220/711 |

FOREIGN PATENT DOCUMENTS 4-154547  5/1992  Japan .

*Primary Examiner*—Robert W. Jenkins
*Attorney, Agent, or Firm*—Pennie & Edmonds

[57] ABSTRACT

A drink making receptacle for mixing and dispensing beverages including a lid with rotation means mounted on the lid and rotation means on the receptacle. Flanges serve to limit rotation of the lid to facilitate beverage dispension without discharge of ice.

5 Claims, 3 Drawing Sheets

5,618,106

BEVERAGE MIXING AND DISPENSING CONTAINER

TECHNICAL FIELD

The present invention relates to a mixing and dispensing container. More particularly, the invention relates to containers used to mix cocktails at bars and restaurants.

BACKGROUND OF THE INVENTION

Numerous restaurants, bars and other establishments make drinks that require mixing several ingredients together. Typically, the establishments use a container into which the ice, liquid and other ingredients are poured. After securing a separate lid to the container, the ingredients are mixed together, and then poured out into a glass which is given to patrons. In some instances the patrons are given the mixing container or a second dispensing container and allowed to pour their own drinks. Often, when drinks are poured, some of the beverage is spilled because the construction of the conventional containers allows the ice or other solids to unexpectedly splash out.

Making and mixing drinks of this type could be done more efficiently if the bartender did not have to keep up with separate lids for the containers, separate containers for the patrons' mixed drinks, and to clean up the spilled beverage from attempts to pour the drinks.

There are several inventions for devices directed to containers for mixing beverages. Devices of this type are disclosed in U.S. Pat. No. 737,014 to O'Neill, U.S. Pat. No. 1,054,833 to Dutton, and U.S. Pat. No. 1,141,207 to Parent. All of these devices can be used for making and mixing drinks that require combining different ingredients. These devices, however, are designed such that the strainer is held either in the straining position manually. U.S. Pat. No. 1,054,833 offers a shank and a spring to hold the strainer in the non-straining position and the strainer is held in the straining (horizontal) position manually.

Thus, prior art containers do not automatically control the flow of a beverage while serving as a mixer. Furthermore, typical containers require assembling several pieces to form a container which holds and strains a beverage.

SUMMARY OF THE INVENTION

In general, the present invention is directed to a device for mixing and dispensing beverages. More particularly, the present invention is a drink making receptacle that facilitates the making and mixing of drinks that require ice or some other solid to be combined with a liquid(s).

The present invention is directed to a container that is generally comprised of a container portion and a rotatable lid secured thereto. Preferably, the lid and the container portion of the receptacle are hingedly connected to form one device. The lid is hinged to the container so that the lid is rotatable to open and close a top portion of the container. Furthermore, the lid is biased by a spring member in a closed or straining position.

More particularly, the present invention is a mixing and dispensing device comprised of a container portion having an open top end and at least one flange extending over the open top end, a lid rotatably secured to the container at substantially the top end for covering a portion of the top end and a spring for biasing the lid in a closed or straining position. More particularly, the lid is secured to the container by a hinge or hinges that separate the lid into a front portion and a back portion wherein the lid is rotatable such that the front portion enters the container and the back portion exits the container when rotated to an open position. The front portion of the lid substantially covers a front portion of the container open end. A small aperture or a plurality of perforations in the front portion of the lid provides a dispensing aperture. The back portion of the lid covers between 30 to 70 percent of a back portion of the container open end creating a substantially sized aperture. The aperture in the back portion of the open end allows for beverages to be poured into the container. Preferably, the back portion of the lid covers approximately 50 percent of the back portion of the open end.

The inventive device allows a person to scoop ice or other solids into the container portion of the receptacle, add liquid through the aperture in the back portion of the open end of the receptacle, and mix or shake the drink by moving the receptacle in a horizontal circle or other similar fashion. The lid and the outlet aperture allow the resulting beverage to be poured out of the receptacle while automatically holding the ice or other solid inside the receptacle. Moreover, the present invention alleviates the need to assemble the several pieces used for making drinks the conventional way and the need to clean up excess liquid spilled as a result of unwanted ice unexpectedly flowing out of the receptacle with the liquid while an unskilled person attempts to pour a drink.

DESCRIPTION OF THE PREFERRED EMBODIMENT

Figure 1:
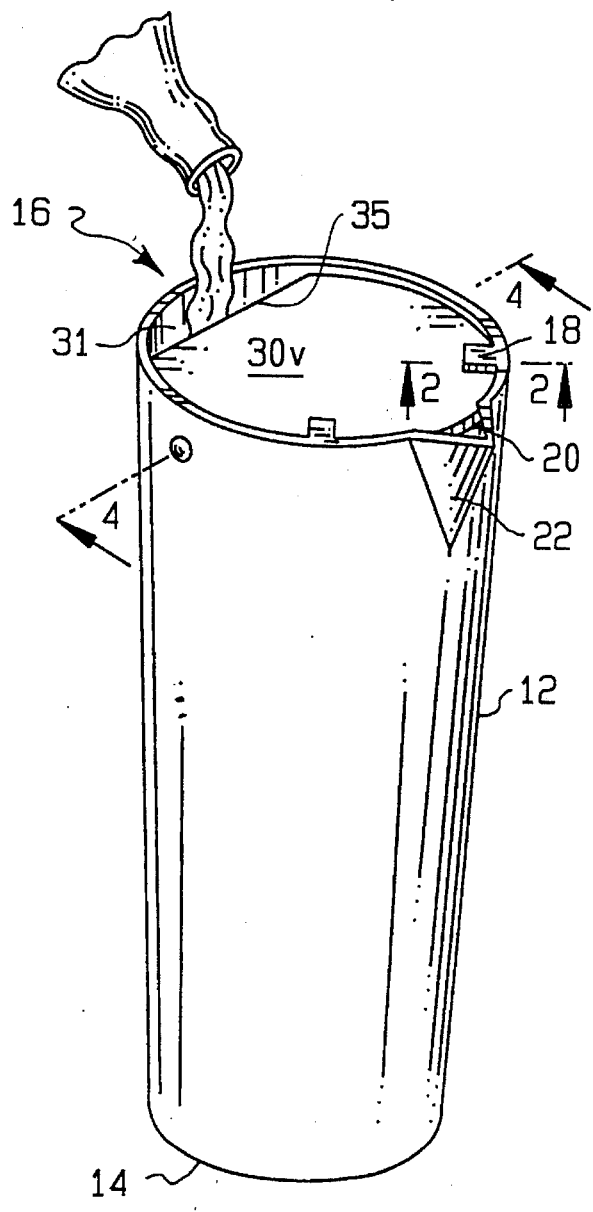
FIG. 1 is a perspective view of a container according to the invention.
Figure 2:
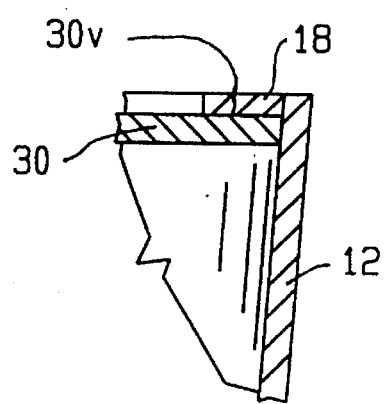
FIG. 2 is a partial sectional view taken along line 2—2 of FIG. 1.
Figure 3:
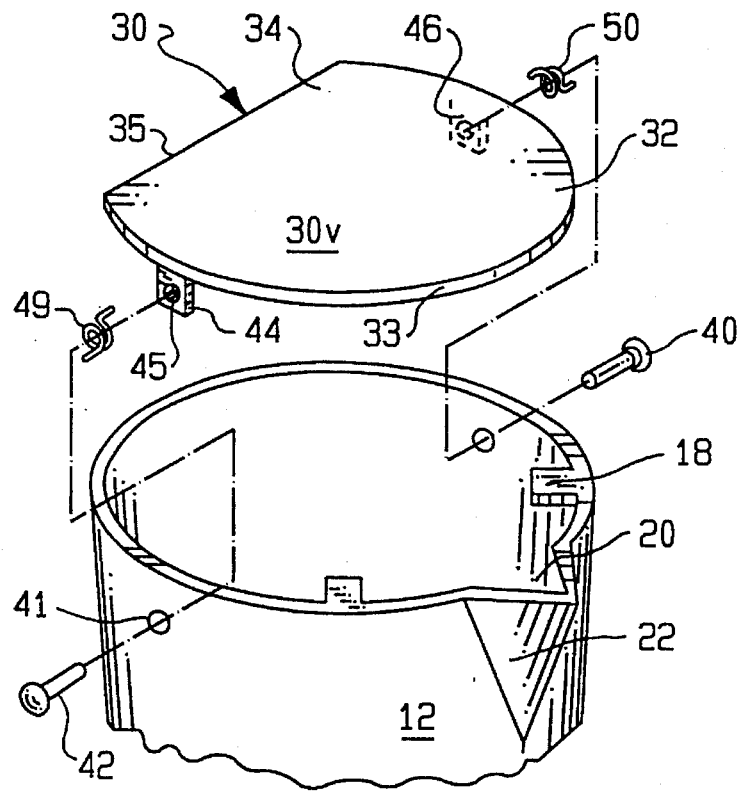
FIG. 3 is a partial exploded view of the upper portion of the container.
Figure 4:
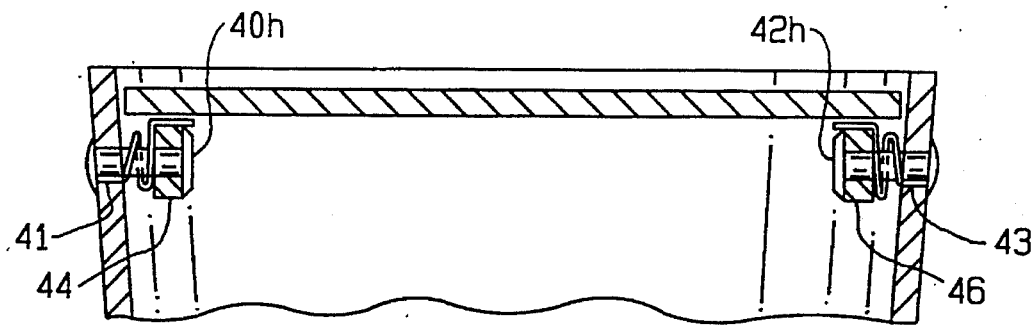
FIG. 4 is a sectional view along line 3—3 of FIG. 1.

Referring to the FIGS. 1–4, a mixing and dispensing container 10 includes container wall 12 of a tapered conical construction extending from closed bottom end 14 up to an open top end 16 which is partially closeable with lid 30. Still further, the container 10 includes at flanges 18 extending perpendicularly from container wall 12. Open top end 16 has a pouring aperture 20 which is formed by spout 22 to permit pouring. Lid 30 has upper surface 30u.

Lid 30 is circular in shape with a segment omitted to provide aperture 31 for filling purposes. Lid 30 is turnable about axle pins 40, 42 which are mounted in wall openings 41, 43 and pass through lid bracket openings 45, 47 of lid brackets 44, 46. Pin axles 40, 42 are deformed during assembly to create heads 40h, 42h (see FIG. 4). Springs 49, 51 bias lid 30 to a closed position against flanges 18. When container 10 is stationary and when it is tilted to pour a mixed beverage flanges 18 function as stops to prevent lid 30 rotation, particularly as the beverage and ice urge lid 30 rotation.

Further, lid front portion 32 has a generally arcuate perimeter 33. Back lid portion 34 has segment edge 35 to form ingredient input aperture 31 for introducing beverage ingredients to be mixed. Preferably, aperture 31 is between 30 to 70% of the area of the open end 16. The pouring aperture 20 is shaped and spaced from lid perimeter 33 such that when pouring beverages, liquid can pass therethrough but solids, such as ice, cannot.

Figure 5:
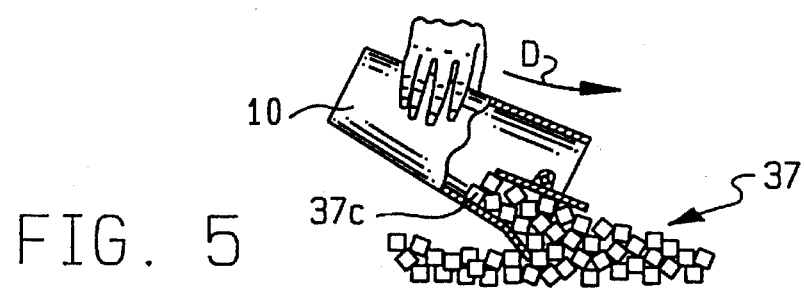
FIG. 5 is an elevational side view showing the invention in operation.

FIG. 5 illustrates container 10 being operated to scoop ice from ice pile 37 by causing container 10 to move in direction D. Ice cubes 37c of pile 37 engage the front portion 32 of lip 30 causing it to swing open against the tension of springs 49, 50 allowing cubes 37c to enter container 10.

Figure 6:
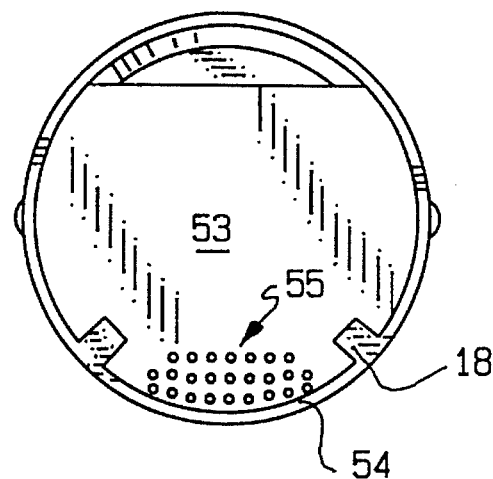
FIG. 6 is a top view of an alternative embodiment of the present invention.

FIG. 6 illustrates another embodiment in which lid 53 has drain holes 55 and container 54 has no spout.

Figure 7:
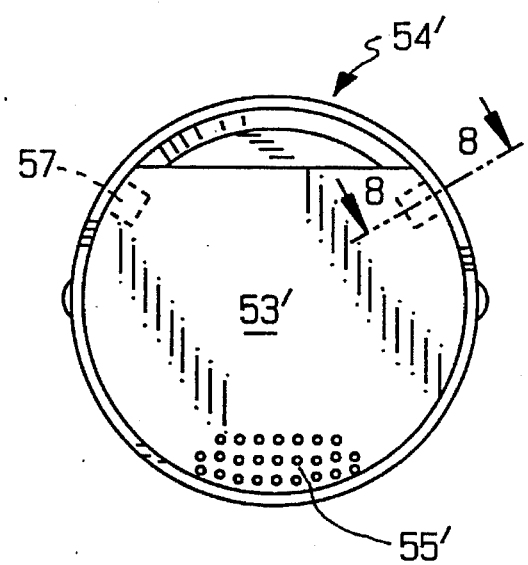
FIG. 7 is a top view of a second alternative embodiment of the invention.
Figure 8:
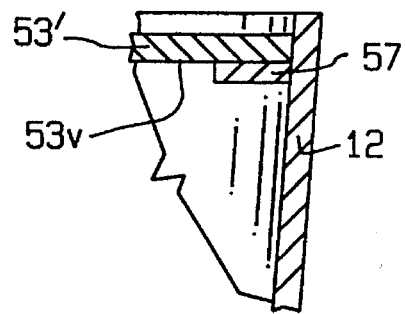
FIG. 8 is a sectional view along line 8—8 of FIG. 7.

Finally, FIGS. 7 and 8 show a further alternate embodiment in which container 54' includes lid 53' which is biased to engage container stop projections 57 which are below lid 53' and engage the under surface 53u of lid 53'. Springs 49', 50', 51' (not shown) cause lid 53' to turn until the under surface 53u engages projections 57 (FIG. 8).

I claim:

1. A drink making receptacle for dispensing and mixing beverages comprising:
   a) a container having a bottom end, a container wall attached to said bottom end, and an open top end having a front portion and a back portion;
   b) a lid including a back portion covering part of the open top end back portion and forming an aperture and a front portion covering substantially all of the front portion of said open top end;
   c) first rotation means mounted on said lid;
   d) second rotation means mounted on the container for cooperation with the first rotation means to permit the lid to rotate from a closed to open position;
   e) stop means on the container to stop the lid when rotated to its closed position; and
   f) spring means biasing said lid toward its closed position against such stop means.

2. The drink making receptacle of claim 1 in which the stop means engages the upper surface of the lid.

3. The drink making receptacle of claim 1 in which the stop means engages the lower surface of the lid.

4. The drink making receptacle of claim 1 in which the stop means are at least one inwardly extending flange extending from the container wall.

5. A drink making receptacle for mixing and dispensing beverages comprising:
   a) a container having a bottom end, a container wall attached to said bottom end, and an open top end having a front portion and a back portion;
   b) a lid including a back portion covering part of the open top end back portion and forming an aperture and a front portion covering substantially all of the front portion of said open top end;
   c) axle pins mounted on the lid and the container to permit the lid to rotate from a closed position to an open position;
   d) a flange on the container to stop the lid when rotated to the closed position; and
   e) a spring for biasing the lid toward its closed position against the flange.

* * * * *